(12) United States Patent
Celik et al.

(10) Patent No.: US 7,257,638 B2
(45) Date of Patent: Aug. 14, 2007

(54) DISTRIBUTING NETWORK APPLICATIONS

(75) Inventors: Tantek Celik, San Francisco, CA (US);
Steven Jon Falkenburg, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 939 days.

(21) Appl. No.: 10/029,310

(22) Filed: Dec. 20, 2001

(65) Prior Publication Data
US 2003/0120792 A1 Jun. 26, 2003

(51) Int. Cl.
*G06F 15/16* (2006.01)

(52) U.S. Cl. .................. 709/231; 725/40; 725/117; 725/147; 715/716; 715/748; 379/201.04; 379/201.05

(58) Field of Classification Search ............... 709/220, 709/228, 218, 230, 201, 203, 246; 725/131, 725/132, 140, 152, 40; 345/581, 762; 715/760, 715/513, 748; 713/1; 717/103; 379/201.04
See application file for complete search history.

(56) References Cited

U.S. PATENT DOCUMENTS

| | | | | |
|---|---|---|---|---|
| 5,666,293 A | * | 9/1997 | Metz et al. ............... 709/220 |
| 5,724,530 A | * | 3/1998 | Stein et al. ............... 715/748 |
| 5,835,759 A | * | 11/1998 | Moore et al. ............... 713/1 |
| 5,937,163 A | * | 8/1999 | Lee et al. ............... 709/218 |
| 6,011,918 A | | 1/2000 | Cohen et al. |
| 6,018,571 A | * | 1/2000 | Langlois et al. ........ 379/201.04 |
| 6,029,045 A | * | 2/2000 | Picco et al. ............... 725/34 |
| 6,061,695 A | * | 5/2000 | Slivka et al. ............... 715/513 |
| 6,486,892 B1 | * | 11/2002 | Stern ............... 715/760 |
| 6,659,861 B1 | * | 12/2003 | Faris et al. ............... 463/1 |
| 6,704,024 B2 | * | 3/2004 | Robotham et al. .......... 345/581 |
| 6,704,798 B1 | * | 3/2004 | Mogul ............... 709/246 |
| 6,990,513 B2 | * | 1/2006 | Belfiore et al. ............. 709/203 |
| 6,990,676 B1 | * | 1/2006 | Proehl et al. ................ 725/40 |
| 2001/0013052 A1 | * | 8/2001 | Benjamin et al. ........... 709/203 |
| 2001/0056460 A1 | * | 12/2001 | Sahota et al. ............... 709/201 |
| 2002/0075308 A1 | * | 6/2002 | Divelbiss et al. ........... 345/762 |
| 2005/0086636 A1 | * | 4/2005 | Sobeski et al. ............. 717/103 |

FOREIGN PATENT DOCUMENTS

WO WO 00/48073 8/2000

* cited by examiner

*Primary Examiner*—Nathan J. Flynn
*Assistant Examiner*—Dustin Nguyen
(74) *Attorney, Agent, or Firm*—Workman Nydegger (57) ABSTRACT

Systems and methods for distributing applications across a server and one or more nodes in a network. When a node is turned on or booted, a node application is requested from the server and loaded on the node. The node application provides a user interface through which other feature applications are selected and run on the node. The node application loads/unloads selected applications and manages node resources for those applications. Each application is developed with a process portion that runs on the server and a user interface portion that is loaded on the node. The node application also provides support to the user interface portion of each application such that the applications may construct user interfaces using the available standards provided by the node application.

43 Claims, 3 Drawing Sheets

DISTRIBUTING NETWORK APPLICATIONS

BACKGROUND OF THE INVENTION

1. The Field of the Invention

The present invention relates to systems and methods for managing distributed applications in a network. More particularly, the present invention relates to systems and methods for delivering and hosting applications that support features of the clients or nodes in the network.

2. Background and Relevant Art

Many homes are receiving content such as television programming and Internet related data from a variety of different broadcast sources. Satellite systems, cable television systems, and computer networks such as the Internet are examples of systems or broadcast sources over which content is received. As different types of content become available, the devices through which this content is accessed (set top boxes and computers) are becoming indistinguishable in the sense that the same set top box that permits a user to view satellite television programming or cable television programming permits the user to browse the Internet. These same set top boxes are often used for email, instant messaging, and other applications such as digital video recording and the like.

As the functionality of set top boxes increases, many homes are beginning to have more than one set top box. For instance, many homes have a set top box for each television set. In order to better manage all of the content that is being received into the home, the content often enters the home through a gateway or a central server computer that is responsible for delivering the content to the various set top boxes (nodes or clients of the central server) in the home. In effect, the home has a small network that connects with outside systems or content sources through the home server computer. The home server computer thus has the responsibility of distributing content to the various nodes or clients of the home network.

Successfully developing applications for the purpose of distributing content throughout a home network to multiple set top boxes from a single server presents several difficulties. In many instances, the various set top boxes either do not correctly implement available standards or they do not implement the standards completely. For example, a particular home may have a satellite set top box on one television and a web browsing set top box on another television. It is likely that that the satellite set top box will not be able to display information or content retrieved from a remote server over the satellite system even though that content may be available to the satellite set top box. In addition, many applications are dependent on a particular system architecture and/or on a particular operating system. Incorrectly implemented standards and dependence on system architectures and operating systems often cause incompatibilities that may result in decreased performance and in unsuccessful delivery of the requested content.

Usually, the central server of a home network is more powerful than the clients or nodes of the home network. Creating a home network in this fashion using less powerful nodes addresses, for example, the issues of cost and distribution of computing load. The cost of a home network to a consumer is reduced because the nodes or clients are not as expensive.

However, the distribution of the computing load between the server and the various nodes is fixed in current networks. This inability to dynamically allocate the resources of a particular node or of the server may result in decreased performance and in a poor user experience. This failure to allocate resources dynamically is complicated by the fact that many applications are designed to execute on a node and are not able to execute on the server. This is significant because in many instances, the server computer is used as if it were a node from some of the household members.

One approach to this problem is a thin client approach. The thin client approach, however, presents a variety of different problems. In a thin client system, for example, the data transport is often accomplished using a graphics device interface (GDI), which effectively draws an object by sending commands to the screen that actually renders the object. GDI, in other words, abstracts the communication between a node and the central server to the level of drawing commands and bitmaps.

This presents several problems. First, future nodes are required to conform to a user interaction that is based on a bitmapped display and any code executing on the node will not be able to properly position video with respect to other content. Additionally, a GDI interface is impractical for other types of nodes. A pure audio node, for example, does not need GDI and is not possible in this scenario.

A thin client solution does not take advantage of the ability to leverage distributed processing. When the distribution between the node and the server is fixed, then increased processing power at the server is not efficiently utilized. This becomes apparent, for instance, as the processor speed increases. Also, the resources of the server become increasingly taxed as the number of nodes in a system increases.

A thick client approach, on the other hand, also suffers from various problems. In recent years, applications have been developed with a client/server or web browser/web server architecture in mind. Developing applications in this manner is efficient because work can be easily divided between software developers and graphic designers. A thick client does not take advantage of this proven development model. Binding applications with each thick client also reduces the ability to change or add partners during development as the look and feel of a particular product is hard to change.

Systems and methods for distributing content and for developing applications that are scalable and distributable are needed.

SUMMARY OF THE INVENTION

These and other problems are overcome by the present invention which is implemented, for example, in a network or distributed system that includes a central server or gateway that is connected with multiple nodes. Applications are distributed across the server and the nodes in accordance with the present invention and through the distributed applications, content such as Internet content and video/audio content is distributed to the various nodes through the central server. Thus, the server is connected with each node and each node has access through the central server to content from various systems or broadcast sources which may include, but are not limited to, satellite systems, cable systems, the Internet, another network, antenna systems, and the like or any combination thereof.

The present invention is directed to systems and methods for delivering distributed content to multiple clients or nodes through a single server and to developing and authoring applications that are scalable and distributable. In one example, each node of the network loads a node application from the central server. The node application provides an overall user interface from which a user may select various applications or features of the node. The node application loads/unloads these applications, provides support and compatibility to the applications running on the node, and allocates resources of the node to the applications. The node application supports various development models including, but not limited to, data driven applications; remote procedure calls, custom loaded code, and the like.

Each application distributed across a node and a server has a user interface portion and a process portion. The user interface portion typically operates or executes on the node and is responsible for rendering, with the support of the node application, HTML, XML, CSS, PNG, MNG, JPEG, MPEG, and the like. The user interface portion is also responsible for executing or processing, with the support of the node application, COM, DCOM, ECMAScript, and the like. The user interface portion typically communicates with the process portion over the network. The process portion typically operates on the server and utilizes the processing power of the server to access and process data, while the user interface portion operates on the node and presents the processed content to the user. Developing a program or an application with a user interface portion on the node and a process portion on the server allows the resources of both the server and the node to be allocated dynamically.

Alternatively, the user interface portion is coupled with one or more service portions that are created by the user interface portion on either the server and/or the node, as appropriate. The service portions can be created on either the server or the node. The service portions also operate to process requests of the user interface portion of the application.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention addresses the development of distributed applications within a network for delivering content. One aspect of the present invention is a node application that is used in distributing applications and content between a central server and the nodes of the network, When the node is booted or turned on, the node application is loaded on each node and displays an initial user interface to a user. All other applications and user interfaces are launched in response to user actions at the node and to incoming notifications from the server.

Each distributed application has a user interface portion and a process portion. The user interface portion is loaded on the node by the node application to present content to the user that is specific to the application. The process portion of the distributed application typically executes on the server and is able to take advantage of the server's resources to perform tasks that are computationally more expensive. Alternatively, the distributed application creates one or more service portions that can execute on either the server or the node to perform requests from the user interface portion.

The node application supports the user interface portion of the distributed application. The node application provides implementation of multiple standards including, but not limited to, HTML, XML, XHTML, CSS, PNG, MNG, JPEG, MPEG, DOM, ECMAScript, SOAP, HTTP, TCP/IP, DCOM and the like. The node application also provides compatibility between the distributed applications and the node, enables applications to gauge and distribute across the server and the node dynamically, and enables applications to be run locally on both the node and the server. The node application supports the loading and running of applications on the node and the server. The node application also allocates resources to the applications currently running on the node.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer, including computer-readable storage media. By way of example, and not limitation, such computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable transmission medium. Thus, any such connection is properly termed a computer-readable transmission medium. Combinations of the above should also be included within the scope of computer-readable media.

Computer-executable instructions comprise, for example, instructions and data which cause a general purpose computer, special purpose computer, or special purpose processing device to perform a certain function or group of functions.

Figure 1:
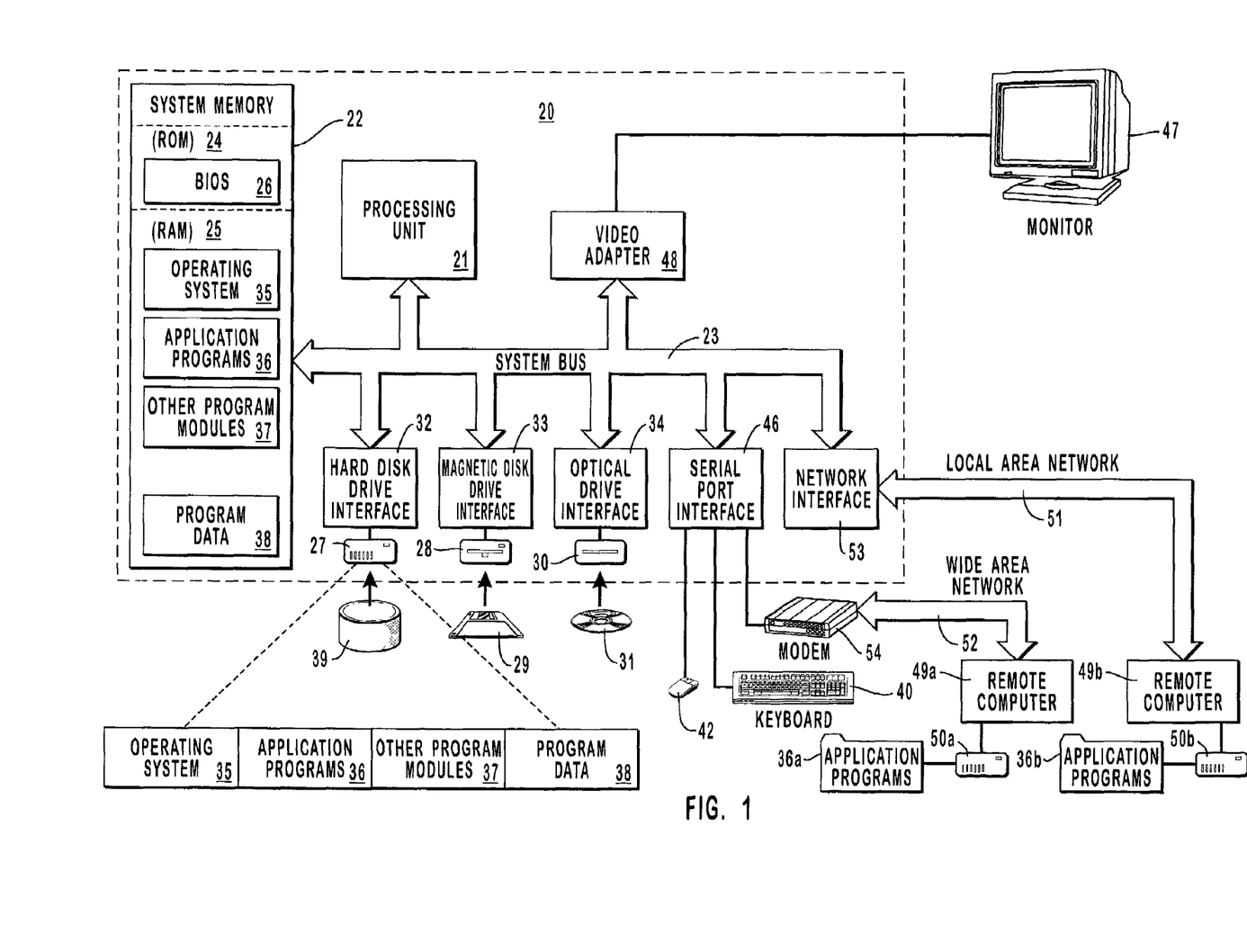
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
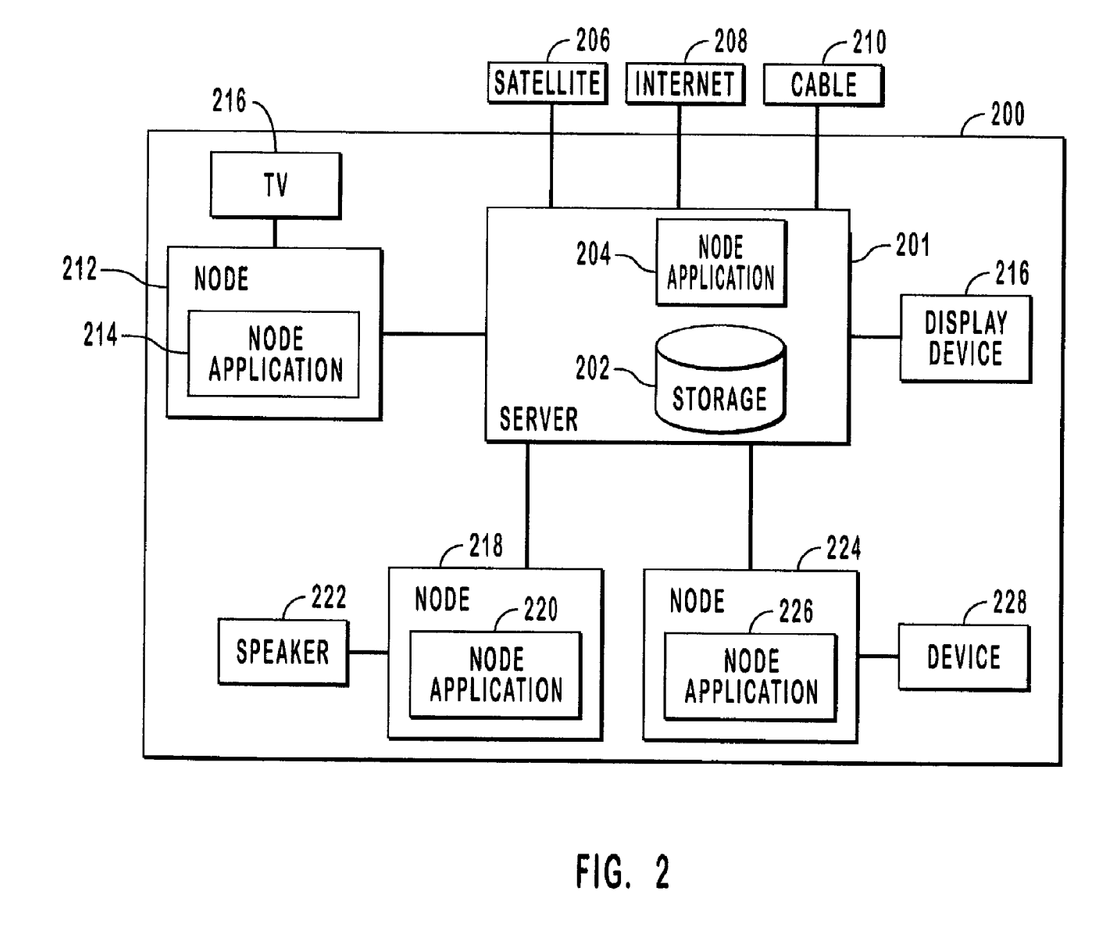
FIG. 2 illustrates an exemplary home network that has a server to distribute content it receives from multiple content sources to multiple nodes in the home network.

FIG. 2 is a block diagram that illustrates an exemplary environment for implementing the systems and methods of the present invention. In this example, FIG. 2 illustrates a network 200 that has access to content through various systems and networks which may include, but are not limited to, a satellite system 206, the Internet 208, a cable system 210 or any combination thereof and the like. The content received or transmitted over the satellite system 206, Internet 208 and cable system 210 includes, but is not limited to, email, instant messages, audio, video, programming guide data, television broadcast data, streaming video/audio data, satellite or cable television content, image data, text, and the like or any combination thereof.

Figure 4A:
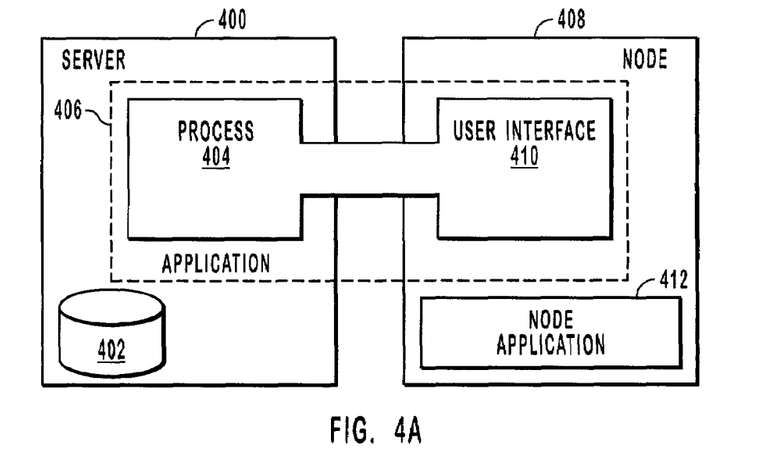
FIG. 4A is a block diagram illustrating the development and implementation of a distributed application used to distribute content.
Figure 4B:
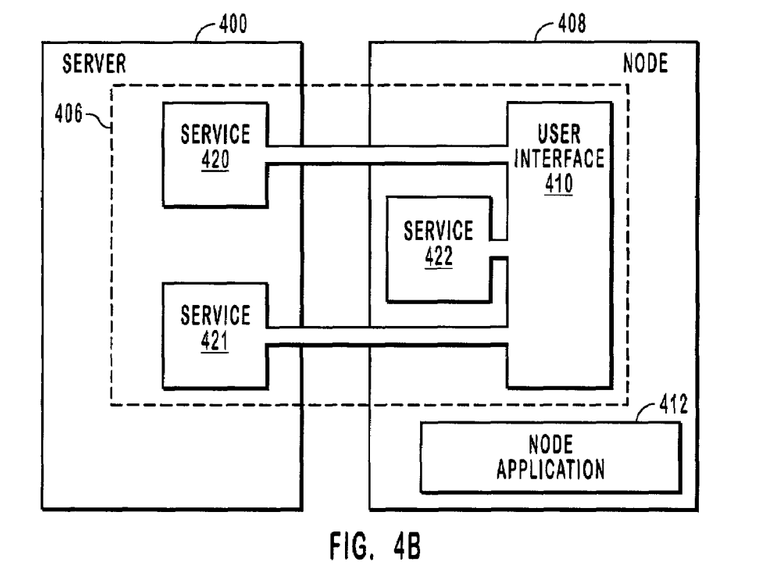
FIG. 4B is a block diagram illustrating another example of the development and implementation of a distributed application where the user interface portion creates service portions on either the node or the server, as appropriate.

FIG. 4B is similar to FIG. 4A except that the process portion has been replaced by service portions 420, 421, and 422. In this example, the user interface portion 410 is able to make procedure and function calls using appropriate protocols. However, the procedure and function calls are made to service portions 420, 421, and/or 422. In this example, the service portion 422 resides and executes on the node 408 while the service portions 420 and 420 reside and execute on the server 400. In one example, the service portions are objects that are capable of, for example, performing tasks or procedures on data. In another example, the service portions are DCOM (distributed component object model) objects and the user interface 410 is able to issue calls to the service portions because the node application supports DCOM. The service portions can be created by the user interface portion or can already exist as part of the server or the node.

The server 201 includes storage 202. The storage 202 is used to store applications and content. For example, the storage 202 may be used to record programs that are broadcast over the satellite and/or cable systems. The storage 202 also stores programming guide data for the programs that will be broadcast over the satellite and cable systems, as appropriate. The storage 202 stores content downloaded over the Internet, emails, instant messages, and the like. The server 201 also provides other components and functionality including, but not limited to, television event recording scheduling and conflict resolution, programming guide data management; satellite data download services, a Network Address Translation (NAT) server, a time server, a Dynamic Host Configuration Protocol (DHCP) server, and the like. Alternatively, some of this functionality may reside at a node.

The network 200 also includes one or more clients that are represented as node 212, node 218, and node 224. Each node is typically connected with the server 201 using various connections that are typically known in the art. In the example of FIG. 2, each node is also connected to at least one device, although a particular node is not required to be connected with a device. For instance, a node may be a computer that has an integrated computer monitor. Alternatively, the node may be a set top box that is associated with a particular device.

In this example, the node 212 is connected with a television 216. Thus, the server 201 is able to distribute video/audio content to the node 212 which is in turn rendered on the television 216. The node 218 is connected with a speaker 222 and the server 201 is able to distribute audio from one of the content sources to the node 218, which delivers the audio to the speaker 222. Other devices are contemplated by the present invention that are related to the type of content received over the content sources. Thus, the device 228 represents devices in general, and may be a television, a computer monitor, a speaker, an interactive frame able to display image content, an Internet appliance, or any other device. The content intended for the device 228 is delivered or distributed through the node 224. Because the server 201 may be used as if it were a node in some instances, a display device 216 is connected with the server 201 in this example.

Each node is capable of executing applications, as will be described below, and each node has a number of resources that are dynamically allocated to the various applications that are executing on the node by a node application described below. Exemplary resources of each node may include, but are not limited to, a processor, a network, input, server resources, memory, screen, sound, and events. Exemplary applications or features of each node may include, but are not limited to, an overall user interface/feature navigation/preferences, programming guide data, an audio/video player, video recording, a media jukebox, web browsing, email, instant messaging, and the like.

Figure 3:
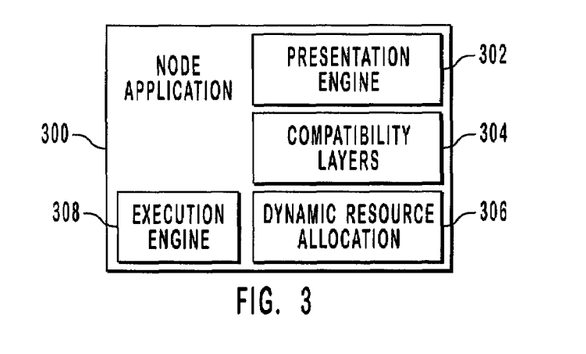
FIG. 3 is a block diagram illustrating the tiered structure of a node application.

As previously mentioned, each node also has a node application that is described with reference to FIG. 3. The node application 300, when loaded on a particular node, enables other applications to be loaded and executed on that node. The node application 300 generates an overall user interface at the node and provides the user with the ability to navigate to various applications, loads and unloads applications on the node, and manages and allocates the node resources for the various applications that are running or will run on the node. The node application 300 may provide support for some applications on the node while other applications will be dynamically loaded/unloaded from the server.

The node application 300 includes a presentation engine 302, an execution engine 308, compatibility layers 304 and dynamic resource allocation module 306. The presentation engine 302 provides complete implementation of various standards including, but not limited to, HTML4, CSS1, PNG 1, other W3C standards and the like. The presentation engine 302 is used by an application to draw or generate a user interface. The execution engine 308 provides implementations of other standards, including but not limited to, DCOM, COM and ECMAScript, that permit the application loaded by the node application to execute code. The compatibility layers 304 allow the node application to execute on different operating systems and processor architectures. The dynamic resource allocation 306 enables specific applications to dynamically gauge and distribute processor load at runtime across the node and the server. The node application 300 also includes other modules, such as a loading module that is used to load and unload the user interface portions of the feature applications and to make requests to the process portion of the application or to service portions associated with the application.

Usually, the nodes are not required to have the same resources as the server 210. In fact, one advantage of the present invention is that the hardware requirements of each node can be significantly reduced. For example, the nodes are not required to have a hard drive or other mass storage device. Each node may have a minimum amount of software and each node relies on the server 201 to provide the processing required by each application. Typically, each node has the following functionality that is usually stored in read only memory (ROM): a boot client; a network stack; a HTTP or TFTP client, and a simple user interface screen.

When a node is turned on or initialized, the boot client displays a simple user interface to the user and obtains an address from the central server. Next, the node application is retrieved from the server. When the central server receives the request for the node application, the central server will provide the node application to the node if a node application is available for that specific node. Alternatively, the central server can request the appropriate node application from another server over a network such as the Internet or by using a dial up connection and the like.

Once the node application is provided to the node, the node application begins to execute on the node and displays a preliminary user interface. In one example, the node application requests a current date and time from the central server. The node application also retrieves node preferences from the central server. If the node is a new node, a preference profile is created for the new node. The node preference or preference profile includes, for example, the location of the node, the type of node, node serial number, node capabilities, and the like. Next, the node application requests an initial user interface from the server and the initial user interface is displayed. From the initial user interface, the user can select applications that will be loaded and executed through the node application.

FIGS. 4A and 4B are block diagrams that illustrate how an application can be distributed between a node and a server. FIG. 4A illustrates an example where the application has a user interface portion executing on the node and a process portion executing on the server. FIG. 4B illustrates an example where the application has a user interface portion executing on the node and one or more service portions that are executing on either the server or the node.

FIG. 4A is a block diagram illustrating both application development and application distribution in a network. FIG. 4A illustrates a server 400 that is connected with a node 408. In this example, the application 406 is dynamically distributed between the node 408 and the server 400. The application 406 includes a process portion 404 on the server 400 and a user interface portion 410 on the node 408. The node application 412 is responsible for loading/unloading the application 406 and for allocating resources of the node 408 to the user interface portion 410 of the application 406. The application 406 operates within the node application and although FIG. 4A illustrates a single application 406, the node application 412 is able to support multiple applications and will allocate the node resources between those applications.

The node application 412 provides support to the user interface portion 410 of the application 406 by providing an implementation of various standards as previously described. The node application 412 thus provides support for data driven applications such as, but not limited to, HTML, XML, XHTML, CSS, PNG, MNG, JPEG, MPEG, and the like or combinations thereof. The node application 412 also provides support for processing aspects of the user interface portion 410, including, but not limited to, DOM, ECMAScript, and the like or combinations thereof. Using the node application 412, the user interface portion 410 is able to build a user interface for the application 406. The user interface portion 410 uses the node application to perform presentation related functions as well as processing related functions.

The node application 412 also supports remote procedure calls (RPC). Distributed Component Object Model (DCOM) and Simple Object Access Protocol (SOAP) are examples of how the node application 412 permits the user interface portion 410 to make function or procedure calls 414 to the process portion 404 of the application 406. The node application 412 also provides for custom loaded code such as behaviors for script or code encapsulation.

FIG. 4B illustrates is similar to FIG. 4A except that the process portion has been replaced by service portions 420, 421, and 422. In this example, the user interface portion 410 is able to make procedure and function calls using appropriate protocols. However, the procedure and function calls are made to service portions 420, 421, and/or 422. In this example, the service portion 422 resides and executes on the node 408 while the service portions 420 and 420 reside and execute on the server 400. In one example, the service portions are objects that are capable of, for example, performing tasks or procedures on data. In another example, the service portions are DCOM (distributed component object model) objects and the user interface 410 is able to issue calls to the service portions because the node application supports DCOM. The service portions can be created by the user interface portion or can already exist as part of the server or the node.

The following example is explained in the context of FIG. 4A using an interface portion and a process portion. This example, however, can be adapted to using service portions as explained in FIG. 4B. One feature of a node is to provide programming content as well as programming guide data to a user. The guide data provides the user with a description of the programming that is currently showing as well as the programming that will be shown in the future. The guide data includes, but is not limited to, starting and ending times, program length, program title, program rating, and the like. A guide data application, in this example, would be responsible for providing or displaying the guide data to the user.

Thus, the guide data application has a process portion or one or more service portions and a user interface portion that are distributed across a server and a node. When the user desires to view the guide data, the user interface portion of the guide data application will make a call to the process portion of the guide data application. The process portion, because it is on the server, will process the request and retrieve the data from a database of guide data. The process portion will also perform any multiplexing of content, and other processing, as required. The data returned to the user interface portion will be displayed by the user interface portion using the support and standards provided by the node application.

More particularly from the perspective of the node application and to illustrate the distribution of the process portion and the user interface portion of the guide data application, assume the user is watching television from within a television application. A guide button is then pressed on a remote control by the user. An event handler in the television application launches the guide data application. The user interface portion components of the guide data application may include, but are not limited to, an XHTML representation of the user interface, a placeholder area within the XHTML for advertisements, a placeholder area with the XHTML to hold a guide data grid, a CSS to describe the presentation and layout of the guide data XHTML, and a behavior to control the dynamic creation of the guide data with user interaction.

Next, the guide data grid is styled by the user interface portion of the guide data application using the CSS provided by the node application and rendered for the user. A request is sent to the server to retrieve ads and the retrieved ads are rendered within the ad placeholder area. The current time is retrieved internally and the channel the node is currently tuning is also retrieved. Then, a query is issued to the server to retrieve the adjacent channels and a query is also issued to the server to retrieve the program names, dates, times, and channel range, which are formatted for display in the grid. These requests for data are processed by the process portion of the application. Thus, the process portion of the guide data application performs each query or request and processes and formats the guide data for display in the grid. Next, the formatted guide data is returned to the node and rendered in the grid placeholder area. As the user scrolls through the guide data, additional requests or queries are made to the server in order to retrieve data for the channels being scrolled by the user. In this manner, applications are distributed across a server and a node.

From the perspective of the central server, distributing an application across the server and a node begins when the server receives a request for the node application. If the server has the node application required by the node, then the server returns the node application and the node application is loaded by the node. Otherwise, the server can access the Internet for the appropriate node application.

When a feature application is selected on the node, the server receives a request for the feature application. The server responds by providing a user interface portion of the feature application to the node and the user interface portion is loaded on the node by the node application. Meanwhile, the process portion of the feature application is loaded on the server. Alternatively, the service portions may be loaded on the server or the node or may already exist on the server or the node The distribution of the application between the server and the node indicates that communication will occur between the process portion or the service portions and the user interface portion. Typically, the user interface portion will make a request for data or for other content. The process portion or a service portion receives the request and processes the request to produce results, which are returned to the node and presented and/or processed by the user interface portion. The process portion or the service portion will access databases, retrieve content from the Internet, format data, save a file, open a file, record a video stream, set preferences, and the like in response to the requests of the user interface portion. For example, when a user interface portion of an application requests guide data, the process portion or the service portion that receives the request will access the database that stores the guide data, retrieve the guide data, and format the guide data before returning the results of the request to the user interface portion.

Other feature applications, such as an application navigation application, a preferences application, an audio/video player, a digital video recorder, a media jukebox, a web browsing application, an email application, and an instant messaging application can be similarly implemented by providing a process portion and a user interface portion for each application or by providing one or more service portions for use by the user interface portion of the application.

These applications may be dynamically distributed at runtime in order to take advantage of the resources that may be available at either the node and/or the server. The more intensive aspects or computation intensive portions of a particular application are implemented on the server, while the presentation or other processing aspects of the application may be implemented in the user interface portion that is loaded by the node application. Because the server is often used as if it were a node, a version of the node application is also implemented on the server such that the development of an application is uniform. In other words, a programmer does not have to develop a special case of an application for the server and a user can execute an application from the server as if the user were executing the application on a node.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters is:

1. In a system that includes one or more nodes each of which are connected with a central server that receives content including audio and video content from a broadcast source, and wherein the content is delivered to the one or more nodes by one or more feature applications, a method for distributing at least one of the one or more feature applications across at least one of the one or more nodes and the central server, the method comprising:

loading a node application at one of the one or more nodes, wherein the node application was requested by the node from the central server;

selecting one of the one or more feature applications for distribution across the node and the central server which receives audio and video content from the broadcast source, wherein the feature application comprises a user interface portion and a process portion;

dynamically allocating, by the node application, resources between the node and the central server, including resources for presenting to a user the audio and video content received by the central server from the broadcast source;

loading the user interface portion of the feature application at the node by the node application, wherein the user interface portion communicates with a process portion of the feature application that is loaded on the central server;

making a request, by the user interface portion, to the process portion for data;

receiving processed data from the process portion, wherein the received processed data was processed by the process portion in response to the request made by the user interface portion; and presenting the processed data at the node.

2. A method as defined in claim 1, further comprising the node application:

loading additional user interface portions of additional feature applications.

3. A method as defined in claim 1, wherein selecting the feature application further comprises receiving user input.

4. A method as defined in claim 1, wherein loading a node application further comprises:

displaying a preliminary user interface at the node;

requesting a current time and a current date from the central server;

requesting user-independent preferences for the node;

requesting an initial user interface; and displaying the initial user interface at the node, wherein the feature application is launched from the initial user interface.

5. A method as defined in claim 1, wherein making a request, by the user interface portion, to the process portion for data further comprises making a remote procedure call using a protocol.

6. A method as defined in claim 5, wherein the protocol is one of COM, DCOM and SOAP.

7. A method as defined in claim 1, wherein presenting the processed data at the node further comprises constructing a user interface using standards provided by the node application.

8. A method as defined in claim 7, wherein constructing a user interface further comprises:

creating an XHTML representation of the user interface;

generating one or more placeholder areas within the XHTML;

describing the presentation and layout of the user interface; and using a behavior to control creation of dynamic content.

9. In a system that includes one or more nodes each of which are connected with a central server that receives content including audio and video content from a broadcast source, and wherein the content is delivered to the one or more nodes by one or more feature applications, a computer program product for implementing a method for distributing at least one of the one or more feature applications across at least one of the one or more nodes and the central server, the computer program product comprising:

a computer readable storage medium having encoded thereon computer executable instructions for performing the method, the method comprising:
  loading a node application at one of the one or more nodes, wherein the node application was requested by the node from the central server;
  selecting one of the one or more feature applications for distribution across the node and the central server that receives audio and video content from a broadcast source, wherein the feature application comprises a user interface portion and a process portion;
  dynamically allocating, by the node application, resources between the node and the central server, including resources for presenting to a user the audio and video content received by the central server from the broadcast source;
  loading the user interface portion of the feature application at the node by the node application, wherein the user interface portion communicates with a process portion of the feature application that is loaded on the central server;
  making a request, by the user interface portion, to the process portion for data;
  receiving processed data from the process portion, wherein the received processed data was processed by the process portion in response to the request made by the user interface portion; and
  presenting the processed data at the node.

10. A computer program product as defined in claim 9, further comprising the node application:
  loading additional user interface portions of additional feature applications.

11. A computer program product as defined in claim 9, wherein selecting the feature application further comprises receiving user input.

12. A computer program product as defined in claim 9, wherein loading a node application further comprises:
  displaying a preliminary user interface at the node;
  requesting a current time and a current date from the central server;
  requesting user-independent preferences for the node;
  requesting an initial user interface; and
  displaying the initial user interface at the node, wherein the feature application is launched from the initial user interface.

13. A computer program product as defined in claim 9, wherein making a request, by the user interface portion, to the process portion for data further comprises making a remote procedure call using a protocol.

14. A computer program product as defined in claim 13, wherein the protocol is one of COM, DCOM and SOAP.

15. A computer program product as defined in claim 9, wherein presenting the processed data at the node further comprises constructing a user interface using standards provided by the node application.

16. A computer program product as defined in claim 15, wherein constructing a user interface further comprises:
  creating an XHTML representation of the user interface;
  generating one or more placeholder areas within the XHTML;
  describing the presentation and layout of the user interface; and
  using a behavior to control creation of dynamic content.

17. In a system that includes one or more nodes each of which are connected with a central server that receives content including audio and video content from a broadcast source, and wherein the content is delivered to the one or more nodes by one or more feature applications, a method for distributing one of the one or more feature applications across one of the one or more nodes and the central server, the method comprising:
  receiving at the central server a request for a node application from a node;
  sending the node application to the node, wherein the node application is retrieved from a remote server over a network if the node application for the node is not stored on the central server;
  receiving at the central server a request for one of the one or more feature applications;
  delivering a user interface portion of the requested feature application to the node, wherein a process portion of the feature application is executed on the central server, and wherein the process portion is executed on the central server to dynamically allocate resources between the node and the central server, including resources for presenting to a user the audio and video content received by the central server from the broadcast source;
  receiving one or more requests for data from the user interface portion;
  in response to each request for data, processing each data request from the user interface portion by the process portion of the feature application accessing the requested data, wherein the process portion utilizes resources of the central server to process each request; and
  providing the user interface portion with results of each request, wherein the user interface portion presents the results to the user, and wherein the results are content received by the central server from a broadcast source providing audio and video content.

18. A method as defined in claim 17, wherein sending the node application further comprises sending an initial user interface to the node.

19. A method as defined in claim 17, wherein processing each request from the user interface portion further comprises formatting the results of each request using a standard.

20. A method as defined in claim 17, wherein providing the user interface portion with results of each request further comprises delivering the results using a protocol.

21. A method as defined in claim 20, wherein the protocol is a remote procedure call.

22. A method as defined in claim 17, wherein processing each request from the user interface portion further comprises accessing content stored on the server or on a remote server.

23. A method as defined in claim 17, further comprising recording content, wherein the content comprises a television program that is received over the satellite system or the cable system.

24. A method as defined in claim 17, further comprising implementing the node application on the central server such that a user can select the feature application from the central server.

25. In a system that includes one or more nodes each of which are connected with a central server that receives content including audio and video content from a broadcast source, and wherein the content is delivered to the one or more nodes by one or more feature applications, a computer program product for implementing a method for distributing at least one of the one or more feature applications across at least one of the one or more nodes and the central server, the computer program product comprising:
  a computer readable storage medium having encoded thereon computer executable instructions for performing the method, the method comprising:

receiving a request for a node application from one of the one or more nodes;

sending the node application to the node, wherein the node application is retrieved from a remote server over a network if the node application for the node is not stored on the central server;

receiving a request for one of the one or more feature applications;

delivering a user interface portion of the feature application to the node, wherein a process portion of the feature application is executed on the central server, and wherein the process portion is executed on the central server to dynamically allocate resources between the node and the central server, including resources for presenting to a user the audio and video content received by the central server from the broadcast source;

receiving one or more requests for data from the user interface portion;

in response to each request for data, processing each data request from the user interface portion by the process portion of the feature application accessing the requested data, wherein the process portion utilizes resources of the central server to process each request; and providing the user interface portion with results of each request, wherein the user interface portion presents the results to the user, and wherein the results are content received by the central server from a broadcast source providing audio and video content.

26. A computer program product as defined in claim 25, wherein sending the node application further comprises sending an initial user interface to the node.

27. A computer program product as defined in claim 25, wherein processing each request from the user interface portion further comprises formatting the results of each request using a standard.

28. A computer program product as defined in claim 25, wherein providing the user interface portion with results of each request further comprises delivering the results using a protocol.

29. A computer program product as defined in claim 28, wherein the protocol is a remote procedure call.

30. A computer program product as defined in claim 25, wherein processing each request from the user interface portion further comprises accessing content stored on the server or on a remote server.

31. A computer program product as defined in claim 25, further comprising recording content, wherein the content comprises a television program that is received over the satellite system or the cable system.

32. A computer program product as defined in claim 25, further comprising implementing the node application on the central server such that a user can select the feature application from the central server.

33. In a system that includes one or more nodes each of which are connected with a central server that receives content including audio and video content from a broadcast source, and wherein the content is delivered to the one or more nodes by one or more feature applications, a method for distributing at least one of the one or more feature applications across at least one of the one or more nodes and the central server, the method comprising:

loading a node application at one of the one or more nodes, wherein the node application was requested by the node from the central server;

selecting one of the one or more feature applications for distribution across the node and the central server which receives audio and video content from the broadcast source, wherein the feature application comprises a user interface portion and one or more service portions that are created by the user interface portion on either the node or the central server when data is needed;

dynamically allocating, by the node application, resources between the node and the central server, including resources for presenting to a user the audio and video content received by the central server from the broadcast source;

loading the user interface portion of the feature application at the node by the node application, wherein the user interface portion communicates with the one or more service portions;

making a request, by the user interface portion, to a particular service portion for data;

receiving processed data from the particular service portion, wherein the received processed data was processed by the particular service portion in response to the request made by the user interface portion; and presenting the processed data at the node.

34. A method as defined in claim 33, further comprising the node application:

loading additional user interface portions of additional feature applications.

35. A method as defined in claim 33, wherein selecting the feature application further comprises receiving user input.

36. A method as defined in claim 33, wherein loading a node application further comprises:

displaying a preliminary user interface at the node;

requesting a current time and a current date from the central server;

requesting user-independent preferences for the node;

requesting an initial user interface; and displaying the initial user interface at the node, wherein the feature application is launched from the initial user interface.

37. A method as defined in claim 33, wherein making a request, by the user interface portion, to the particular service portion for data further comprises making a remote procedure call using a protocol.

38. A method as defined in claim 37, wherein the protocol is one of COM, DCOM and SOAP.

39. A method as defined in claim 33, wherein presenting the processed data at the node further comprises constructing a user interface using standards provided by the node application.

40. A method as defined in claim 39, wherein constructing a user interface further comprises:

creating an XHTML representation of the user interface;

generating one or more placeholder areas within the XHTML;

describing the presentation and layout of the user interface; and using a behavior to control creation of dynamic content.

41. A method as recited in claim 1, wherein the central server acts as a gateway to a home network.

42. A method as recited in claim 1, wherein the processed data is distributed to the one or more nodes through a single server.

43. A method as recited in claim 1, wherein selecting the feature application for distribution includes selecting the feature application using the node application requested from the central server.

* * * * *